United States Patent
Borzyk et al.

(10) Patent No.: US 6,811,601 B2
(45) Date of Patent: Nov. 2, 2004

(54) PIGMENT PREPARATIONS COMPRISING ALKOXYLATED POLYETHYLENIMINE

(75) Inventors: Oliver Borzyk, Speyer (DE); Jürgen Huff, Ludwigshafen (DE); Manfred Mielke, Heidelberg (DE); Rüdiger Sens, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/296,444

(22) PCT Filed: May 15, 2001

(86) PCT No.: PCT/EP01/05490

§ 371 (c)(1),
(2), (4) Date: Nov. 25, 2002

(87) PCT Pub. No.: WO01/92421

PCT Pub. Date: Dec. 6, 2001

(65) Prior Publication Data

US 2004/0035326 A1 Feb. 26, 2004

(30) Foreign Application Priority Data

May 27, 2000 (DE) .......................... 100 26 466

(51) Int. Cl.⁷ ................................. C08K 5/16
(52) U.S. Cl. ............ 106/499; 106/31.75; 106/402; 106/412; 106/414; 106/420; 106/421; 106/429; 106/432; 106/448; 106/452; 106/453; 106/459; 106/460; 106/471; 106/476; 106/479; 106/480; 106/493; 106/496; 106/497; 106/498; 430/137.1

(58) Field of Search ............... 106/31.75, 402, 106/412, 414, 420, 421, 429, 432, 448, 452, 453, 459, 460, 471, 476, 479, 480, 493, 496, 499; 430/137.1

(56) References Cited

U.S. PATENT DOCUMENTS

| 4,789,400 A | 12/1988 | Solodar et al. ............... 106/22 |
| 5,017,644 A | 5/1991 | Fuller et al. ................. 524/612 |
| 5,364,462 A | 11/1994 | Crystal et al. ................ 106/22 |
| 5,958,999 A | 9/1999 | Bates et al. ................. 523/161 |
| 5,968,244 A | 10/1999 | Euda et al. .................. 106/31 |

FOREIGN PATENT DOCUMENTS

| EP | 359034 | | 3/1990 |
| EP | 514159 | | 11/1992 |
| EP | 622429 | | 11/1994 |
| EP | 1132440 | A2 * | 9/2001 |
| JP | 6-220395 | | 8/1994 |
| JP | 10-60352 | | 3/1998 |
| WO | 99/38053 | | 7/1999 |
| WO | 99/67352 | | 12/1999 |

\* cited by examiner

Primary Examiner—Anthony J. Green
(74) Attorney, Agent, or Firm—Keil & Weinkauf

(57) ABSTRACT

Pigment preparations comprising
A) at least one organic or inorganic pigment and
B) at least one ethoxylated and propoxylated and/or butoxylated polyethyleneimine.

8 Claims, No Drawings

PIGMENT PREPARATIONS COMPRISING ALKOXYLATED POLYETHYLENIMINE

DESCRIPTION

The present invention relates to novel pigment preparations comprising

A) at least one organic or inorganic pigment and

B) at least one ethoxylated and propoxylated and/or butoxylated polyethyleneimine.

This invention further relates to the use of these pigment preparations for producing aqueous pigment dispersions, inks, including printing inks, and paints and also to pigment preparations for the ink-jet process.

The use of pigments, i.e., colorants that are insoluble in the application medium, generally requires the presence of dispersants, since pigment particles are subject to mutual forces of attraction and so tend to agglomerate or flocculate, which manifests itself through higher viscosities or worse color properties, especially insufficient color strength or lack of brilliance. Dispersants have a surface-active effect and so substantially lower the interfacial tension between the particles and also the dispersing work needed to subdivide particles.

Inks for the ink-jet process require particularly good dispersing of the pigment particles and stabilization of the pigment dispersion so that cloggage of the printer nozzles during printing as well as nonprinting times may be avoided and adequate stability in storage may be ensured. Special requirements also apply to the production of carbon black dispersions, since carbon black particles are generally even finer than color pigments.

WO-A-99/38053 discloses ink-jet inks based on carbon black pigments surface-modified by organic groups and containing hydroxyethylated, ethoxylated, hydroxypropylated or nonderivatized polyethyleneimines to improve wetfastness.

JP-A-060 352/1998 discloses overhead projector foil ink-jet inks containing nonmodified polyethyleneimines or polyacrylic acid/polyethyleneimine copolymers to fix the print on the foils as well as an acrylate-based dispersant.

It is an object of the present invention to provide novel pigment preparations having advantageous application properties in the production of aqueous pigment dispersions, inks, including printing inks, especially ink-jet inks, and coatings in the ink-jet process and not requiring any additional modification of the pigment surface or the presence of further assistants.

We have found that this object is achieved by the pigment preparations defined at the beginning.

Pigment preparations according to the invention include an organic or inorganic pigment as component (A). The term "organic pigment" as used herein also comprehends vat dyes. It will be appreciated that pigment preparations according to the invention may also include mixtures of different organic or different inorganic pigments or organic and inorganic pigments.

Examples of suitable pigments (A) are:

Organic pigments:

| | |
|---|---|
| monoazo pigments: | C.I. Pigment Brown 25; |
| | C.I. Pigment Orange 5, 13, 36 and 67; |
| | C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; |
| | C.I. Pigment Yellow 1, 3, 73, 74, 65, 97, 151 and 183; |
| disazo pigments: | C.I. Pigment Orange 16, 34 and 44; |
| | C.I. Pigment Red 144, 166, 214 and 242; |
| | C.I. Pigment Yellow 12, 13, 14, 16, 17, 81, 83, 106, 113, 126, 127, 155, 174, 176 and 188; |
| anthanthrone pigments: | C.I. Pigment Red 168 (C.I. Vat Orange 3); |
| anthraquinone pigments: | C.I. Pigment Yellow 147 and 177; |
| | C.I. Pigment Violet 31; |
| anthrapyrimidine pigments: | C.I. Pigment Yellow 108 (C.I. Vat Yellow 20); |
| quinacridone pigments: | C.I. Pigment Red 122, 202 and 206; |
| | C.I. Pigment Violet 19; |
| quinophthalone pigments: | C.I. Pigment Yellow 138; |
| dioxazine pigments: | C.I. Pigment Violet 23 and 37; |
| flavanthrone pigments: | C.I. Pigment Yellow 24 (C.I. Vat Yellow 1); |
| indanthrone pigments: | C.I. Pigment Blue 60 (C.I. Vat Blue 4) and 64 (C.I. Vat Blue 6); |
| isoindoline pigments: | C.I. Pigment Orange 69; |
| | C.I. Pigment Red 260; |
| | C.I. Pigment Yellow 139 and 185; |
| isoindolinone pigments: | C.I. Pigment Orange 61; |
| | C.I. Pigment Red 257 and 260; |
| | C.I. Pigment Yellow 109, 110, 173 and 185; |
| isoviolanthrone pigments: | C.I. Pigment Violet 31 (C.I. Vat Violet 1); |
| metal complex pigments: | C.I. Pigment Yellow 117, 150 and 153; |
| | C.I. Pigment Green 8; |
| perinone pigments: | C.I. Pigment Orange 43 (C.I. Vat Orange 7); |
| | C.I. Pigment Red 194 (C.I. Vat Red 15); |
| perylene pigments: | C.I. Pigment Black 31 and 32; |
| | C.I. Pigment Red 123, 149, 178, 179 (C.I. Vat Red 23), 190 (C.I. Vat Red 29) and 224; |
| | C.I. Pigment Violet 29; |
| phthalocyanine pigments: | C.I. Pigment Blue 15, 15:1, 15:2, 15:3, 15:4, 15:6 and 16; |
| | C.I. Pigment Green 7 and 36; |
| pyranthrone pigments: | C.I. Pigment Orange 51; |
| | C.I. Pigment Red 216 (C.I. Vat Orange 4); |
| thioindigo pigments: | C.I. Pigment Red 88 and 181 (C.I. Vat Red 1); |
| | C.I. Pigment Violet 38 (C.I. Vat Violet 3); |
| triarylcarbonium pigments: | C.I. Pigment Blue 1, 61 and 62; |
| | C.I. Pigment Green 1; |
| | C.I. Pigment Red 81, 81:1 and 169; |
| | C.I. Pigment Violet 1, 2, 3 and 27; |

C.I. Pigment Black 1 (aniline black);
C.I. Pigment Yellow 101 (aldazine yellow);
C.I. Pigment Brown 22;

vat dyes (in addition to those already mentioned above):

C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;

-continued

C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;
C.I. Vat Black 1, 2, 7, 8, 9, 13, 14, 16, 19, 20, 22, 25, 27, 28, 29, 30, 31, 32, 34, 36, 56, 57, 58, 63, 64 and 65;

inorganic pigments:

| | |
|---|---|
| white pigments: | titanium dioxide (C.I. Pigment White 6), zinc white, pigment grade zinc oxide; zinc sulfide, lithopone; lead white; |
| black pigments: | iron oxide black (C.I. Pigment Black 11), iron manganese black, spinel black (C.I. Pigment Black 27); carbon black (C.I. Pigment Black 7); |
| color pigments: | chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt violet, manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinel and corundum phases (C.I. Pigment Brown 24, 29 and 31), chrome orange; iron oxide yellow (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184); |
| interference pigments: | metallic effect pigments based on coated metal platelets; pearl luster pigments based on mica platelets coated with metal oxide; liquid crystal pigments. |

Preferred pigments in this context are monoazo pigments (especially laked BONS pigments, naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments and carbon blacks (in particular gas blacks or furnace blacks).

Examples of particularly preferred pigments are specifically: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

Pigment preparations according to the invention include as component (B) one or more ethoxylated and propoxylated or ethoxylated and butoxylated or ethoxylated, propoxylated and butoxylated polyethyleneimine dispersants.

Preferably the polyethyleneimine was initially propoxylated or butoxylated and then ethoxylated.

Preference is given to polyethyleneimines (B) containing from 1 to 10 mol, especially from 1 to 6 mol, in particular from 2 to 5 mol, of propylene oxide or butylene oxide units per mole of NH function.

The ethylene oxide content of the polyethyleneimines (B) is preferably from 10 to 40 mol, particularly preferably from 15 to 35 mol, very particularly preferably from 20 to 30 mol, of ethylene oxide units per mole of NH function.

Particularly useful polyethyleneimines contain at least 12, especially from 20 to 45, in particular from 25 to 40, mol of alkylene oxide units per mole.

Generally the polyethyleneimine forming component (B) had a pre-alkoxylation average molecular weight $M_w$ of from 600 to 25 000 g/mol, preferably from 1200 to 20 000 g/mol, particularly preferably from 2000 to 5000 g/mol, very particularly preferably of about 3000 g/mol.

The polyethyleneimines (B) are known from WO-A-99/67352 and can be prepared as described therein.

The pigment preparations of the present invention typically contain, based on the weight of pigment (A), from 5 to 200% by weight, especially from 20 to 100% by weight, of dispersant (B).

The dispersant (B) provides durable stabilization of very finely divided pigment dispersions, including in particular very finely divided carbon black dispersions. Generally 95%, preferably 99%, of pigment particles (A) have a particle size $\leq 1$ $\mu$m, preferably $\leq 0.5$ $\mu$m.

The pigment preparations of the present invention are very useful for producing aqueous pigment dispersions, waterborne inks (writing inks and especially ink-jet inks), solventborne inks, paints and toners.

Preferably pigment (A) and dispersant (B) are mixed with each other in the particular application medium. In the case of liquid application media, dispersing is advantageously effected using dissolvers (predispersing) and ball mills (fine dispersing), such as bead mills, high performance mills with small grinding media, e.g., double bead cylinder bead mills, and centrifugal fluidized bed mills.

The pigment preparations of the present invention are particularly useful for producing ink-jet inks.

The similarly inventive pigment preparations for the ink-jet process (hereinafter ink-jet inks for short) comprise A) at least one organic or inorganic pigment,
B) at least one dispersant based on ethoxylated and propoxylated and/or butoxylated polyethyleneimine, and
C) an aqueous ink medium.

The aqueous ink medium (C) includes as its main component water (C1), preferably present mixed with one or more high-boiling (i.e., boiling point generally >100° C.) and hence water-retaining organic solvents (C2) that are soluble in or miscible with water.

The organic solvent (C2) preferably comprises one or more solvents selected from the group consisting of polytetrahydrofuran having an average molecular weight M, of from 150 to 500 g/mol, polyhydric alcohols, polyethylene glycols, polypropylene glycols, polyethylene glycol monoalkyl ethers, polypropylene glycol monoalkyl ethers, pyrrolidone and N-alkylpyrrolidones.

Particularly useful ink-jet inks according to the invention include polytetrahydrofuran as constituent of the organic solvent component (C2). Polytetrahydrofurans having an average molecular weight $M_w$ of from 200 to 300 g/mol are preferred and of about 250 g/mol (corresponding to a molecular weight distribution from 225 to 275 g/mol; Poly-THF 250, BASF) are particularly preferred.

The polytetrahydrofuran may be prepared in known manner by cationic polymerization of tetrahydrofuran. The products are linear polytetramethylene glycols.

The polytetrahydrofuran may be mixed with one or more (e.g., two, three or four) organic solvents.

Useful organic solvents (C2) further include polyhydric alcohols, preferably branched and unbranched polyhydric alcohols containing from 2 to 8, especially from 3 to 6, carbon atoms, such as ethylene glycol, 1,2- and 1,3- propylene glycol, glycerol, erythritol, pentaerythritol, pentitols such as arabitol, adonitol and xylitol and hexitols such as sorbitol, mannitol and dulcitol.

Useful solvents (C2) further include polyethylene glycols and polypropylene glycols (which is also to be understood as meaning the lower polymers (di-, tri- and tetramers)) and their mono (especially $C_1$–$C_6$, in particular $C_1$–$C_4$) alkyl ethers. Preference is given to polyethylene and polypropylene glycols having average molecular weights of from 100 to 1500 g/mol, in particular from 200 to 800 g/mol, especially from 300 to 500 g/mol. Examples are diethylene glycol, triethylene glycol, tetraethylene glycol, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, di-, tri- and tetra-1,2- and -1,3-propylene glycol and di-, tri- and tetra-1,2- and -1,3-propylene glycol monomethyl, monoethyl, monopropyl and monobutyl ether.

Useful solvents (C2) further include pyrrolidone and N-alkylpyrrolidones whose alkyl chain preferably contains from 1 to 4, especially 1 or 2, carbon atoms. Examples of useful alkylpyrrolidones are N-methylpyrrolidone, N-ethylpyrrolidone and N-(2-hydroxyethyl)pyrrolidone.

Examples of particularly preferred solvents (C2) are the polytetrahydrofurans described above, 1,2-propylene glycol, 1,3-propylene glycol, glycerol, sorbitol, diethylene glycol, polyethylene glycol (M, 300–500 g/mol), diethylene glycol monobutyl ether, triethylene glycol monobutyl ether, pyrrolidone, N-methylpyrrolidone and N-(2-hydroxyethyl) pyrrolidone.

The solvent component (C2) may advantageously be supplemented with urea (generally in amounts from 0.5 to 3% by weight, based on the weight of the ink-jet ink) to further reinforce the water-containing effect of the solvent mixture (C2).

The ink-jet inks of the present invention include generally from 0.1 to 40% by weight, preferably from 5 to 30% by weight, particularly preferably from 10 to 25% by weight, very particularly preferably from 10 to 20% by weight, of organic solvent component (C2).

Preference is given to using a mixture of organic solvents (C2) in which the weight ratio of polytetrahydrofuran to further solvent is in the range from 1:20 to 1:1. Ink-jet inks according to the invention accordingly include preferably from 0.5 to 20% by weight, especially from 1 to 10% by weight, of polytetrahydrofuran and from 1 to 30% by weight, especially from 1 to 20% by weight, of further solvent (C2).

Water is the main constituent (C1) of ink-jet inks according to the invention. The water content is customarily in the range from 50 to 95% by weight, preferably in the range from 60 to 80% by weight.

The pigment (A) is generally present in the ink-jet inks of the present invention in amounts of generally from 0.01 to 20% by weight, preferably from 0.2 to 10% by weight, particularly preferably from 1 to 6% by weight.

The ink-jet inks of the present invention further include generally from 0.1 to 25% by weight, preferably from 0.5 to 10% by weight, of dispersant (B).

It will be appreciated that the ink-jet inks of the present invention may include further assistants of the type which are customary especially for (aqueous) ink-jet inks and in the printing and coatings industry. Examples of such assistants include preservatives (such as 1,2-benzisothiazolin-3-one and its alkali metal salts, glutaraldehyde and/or tetramethylolacetylenediurea), antioxidants, degassers/defoamers (such as acetylenediols and ethoxylated acetylenediols, which customarily contain from 20 to 40 mol of ethylene oxide per mole of acetylenediol and also have a dispersing effect), viscosity regulators, flow agents, wetters which can be used in amounts of from 0.5 to 5% by weight to reduce the surface tension of the ink (e.g., wetting surfactants based on ethoxylated or propoxylated fatty or oxo alcohols, propylene oxide/ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates), anti-settlers, luster improvers, lubricants, adhesion improvers, anti-skinning agents, delusterants, emulsifiers, stabilizers, water repellents, light control additives, hand improvers, antistats and bases such as triethanolamine to regulate the pH. When these agents are part of ink-jet inks according to the invention, their total amount is generally ≦5% by weight, especially ≦2% by weight, in particular ≦1% by weight, based on the weight of the ink-jet ink.

The ink-jet inks of the present invention customarily have a dynamic viscosity of from 1 to 5 mm$^2$/sec, preferably from 1 to 3 mm$^2$/sec.

The surface tension of the ink-jet inks of the present invention is generally in the range from 20 to 70 mN/m, preferably from 25 to 40 mN/m. The pH of the ink-jet inks-of the present invention is generally in the range from 5 to 10, preferably from 7 to 9.

Ink-jet inks according to the invention are advantageously prepared as follows:

The pigment (A), for example in the form of an aqueous presscake, is mixed together with the dispersant (B) in the presence of water and dispersed in a suitable apparatus. The resulting mixture is then ground in a mill to the desired particle size distribution (generally ≦1 μm, preferably ≦0.5 μm). After the desired colorant concentration has been set by addition of solvent (C2), water and optionally further assistants, the preparation is filtered using a filtering means with fines removal within the range from 1 to 0.5 μm.

The ink-jet inks of the invention can be used with advantage for printing sheetlike or three-dimensionally configured substrates by the ink-jet process, which comprises printing the ink-let inks onto the substrate and if desired subsequently fixing the print obtained.

In the ink-jet process, the typically aqueous inks are sprayed in small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The ink-jet inks of the invention are particularly useful as inks for the bubble jet process or the process employing a piezoelectric crystal.

If the print is to be fixed, this may be done in a known manner and as described in WO-A-99/01516 by, for example, applying a binder, if desired in the form of a dispersion or emulsion, to the printed substrate and curing the binder or laminating on a film.

Further details concerning these binders are to be found in WO-A-99/01516.

The ink-jet inks of the invention may be printed on all types of substrate materials. Examples of substrate materials include

- coated or uncoated cellulosics such as paper, paperboard, cardboard, wood and woodbase,
- coated or uncoated metallic materials such as foils, sheets or workpieces composed of aluminum, iron, copper, silver, gold, zinc or alloys thereof,
- coated or uncoated silicatic materials such as glass, porcelain and ceramics,
- polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin,
- textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric,
- leather—both natural and artificial—in the form of smooth leather, nappa leather or suede leather,
- comestibles and cosmetics.

The substrate material may be sheetlike or three-dimensional in configuration and may be printed with the ink-jet inks of the invention both uniformly and imagewise.

Ink-jet inks according to the invention have altogether advantageous application properties, especially good start-of-print behavior, good sustained use behavior (kogation) and good storage stability, producing prints of high quality, i.e., brilliance and depth of shade, and also high rubfastness, lightfastness, waterfastness and wetrubfastness. They are particularly useful for printing coated and uncoated paper.

EXAMPLES

Preparation of Alkoxylated Polyethyleneimines used According to Invention (Dispersant B)

The preparation will now be described by way of example with reference to PEI3000/3PO/27EO, the other alkoxylated polyethyleneimines were prepared similarly.

86 g of a 50% by weight aqueous solution of polyethyleneimine ($M_w$ 3000 g/mol, corresponding to 1 mol based on ethyleneimine) were introduced into a pressuretight reactor and, after three purges with nitrogen and sealing of the reactor, heated to 90° C. with stirring. 58 g (1 mol) of propylene oxide were then injected. The batch was stirred to constant pressure and then cooled down to 80° C.

After the reactor had been depressurized and again purged three times with nitrogen, 8.6 g of a 50% by weight aqueous potassium hydroxide solution and 400 g of xylene were added. After a reflux condenser had been fitted, the batch was xylene-refluxed under a water separator until the xylene in the water separator became clear (about 5 h). 116 g (2 mol) of propylene oxide were then initially metered in at 140–145° C. and a pressure of up to 8 bar. After stirring to constant pressure, 1188 g (27 mol) of ethylene oxide were metered in under the same conditions.

Renewed stirring to constant pressure, cooling to 80° C. and purging three times with nitrogen were followed by stripping the batch with steam at 100 to 110° C. for 5 h. The alkoxylated polyethyleneimine was then converted into a 70% by weight aqueous solution which was used in the following experiments.

The following abbreviations apply:
B1: PEI 3000/3PO/27EO
B2: PEI 3000/1PO/29EO
B3: PEI 3000/6PO/24EO
B4: PEI 3000/10PO/20EO
B5: PEI 3000/3BuO/27EO
B6: PEI 3000/1BuO/29EO A) Preparation and Testing of Inventive Carbon Black Dispersions Examples 1 to 8

A mixture of 8 g (or 20 g in Inventive Examples 6 to 8) of carbon black pigment A, 1 g of dispersant B1 (70% by weight aqueous solution, reckoned 100%) and 190.6 g (or 178.6 g in Inventive Examples 6 to 8) of water was dispersed at 23° C. with an Ultra Turrax T25 (from Janke & Kunkel) at 800 rpm for 2 min.

After 1 min the viscosity of the carbon black dispersions obtained was measured in a DV II viscometer (Spindel 61 to 63, from Brookfield).

Details concerning these experiments and their results are summarized in Table 1. For comparison, it also lists the viscosities obtained without dispersant B1 (Comparative Examples 1 to 8).

DBP=dibutyl phthalate absorption
PS=average particle size

TABLE 1

| Ex. | Carbon black pigment A | | | Concentration | |
| | DBP [ml/100 g] | BET [m²/g] | PS [nm] | Carbon black dispersion | Viscosity [mPas] |
| --- | --- | --- | --- | --- | --- |
| Inv. 1 | 55 | 90 | 25 | 4% by weight | 2.5 |
| Comp. 1 | 55 | 90 | 25 | 4% by weight | 12.0 |
| Inv. 2 | 74 | 210 | 17 | 4% by weight | 8.0 |
| Comp. 2 | 74 | 210 | 17 | 4% by weight | 22.0 |
| Inv. 3 | 100 | 560 | 13 | 4% by weight | 2.5 |
| Comp. 3 | 100 | 560 | 13 | 4% by weight | 10.0 |
| Inv. 4 | 114 | 115 | 21 | 4% by weight | 2.8 |
| Comp. 4 | 114 | 115 | 21 | 4% by weight | 90.0 |
| Inv. 5 | 124 | 87 | 27 | 4% by weight | 3.0 |
| Comp. 5 | 124 | 87 | 27 | 4% by weight | 150.0 |
| Inv. 6 | 55 | 90 | 25 | 10% by weight | 12.2 |
| Comp. 6 | 55 | 90 | 25 | 10% by weight | 93.0 |
| Inv. 7 | 74 | 210 | 17 | 10% by weight | 118.0 |
| Comp. 7 | 74 | 210 | 17 | 10% by weight | 227.0 |
| Inv. 8 | 100 | 560 | 13 | 10% by weight | 55.9 |
| Comp. 8 | 100 | 560 | 13 | 10% by weight | 140.0 |

Examples 9 to 19

A mixture of 4.5 g of carbon black pigment A, 4.5 g of dispersant B (70% by weight aqueous solution, reckoned 100%), 1.5 g of di-1,2-propylene glycol, 0.12 g of a 50% by weight aqueous solution of glutaraldehyde, 0.15 g of a 475 by weight aqueous solution of tetramethylolacetylenediurea, 0.3 g of triethanolamine and 18.9 g of water was shaken in a 100 ml twist closure glass together with 30 g of glass balls (0.25–0.5 mm in diameter) on a Skandex machine for 2 h and then diluted with water to a carbon black content of 1% by weight.

The median particle size ($d_{50}$) of the carbon black particles in each carbon black dispersion obtained was then determined using the Coulter LS 230 particle size counter.

Each carbon black dispersion obtained was then knife-coated onto surface-coated paper (paper for 720 dpi Printing, Epson) using a 10 μm doctor blade. The optical density of the knife coating was measured at 530 nm using a Datacolor 600+spectrophotometer and an Ulbircht sphere without gloss (gloss trap open).

Further details concerning these experiments and the results are summarized in Table 2.

Examples 20 to 25

Examples 9 to 19 were repeated with twice the batch and using 1,2-propylene glycol instead of di-1,2-propylene glycol.

The carbon black particle size in the 1% by weight dispersions and the optical density of the knife coatings were measured as in Inventive Examples 9 to 19.

In addition, the dispersion stability of the dispersions was tested. All the dispersions were still homogeneous after seven weeks of storage at 60° C. and a subsequent four weeks of storage at −5° C.

Further details concerning the experiments and the results are likewise summarized in Table 2.

TABLE 2

| | Carbon black pigment A | | | | |
|---|---|---|---|---|---|
| Ex. | DBP [ml/100 g] | BET [m²/g] | PS [min] | B | Optical density |
| 9 | 170 | 320 | 67 | B1 | 1.13 |
| 10 | 145 | 350 | 122 | B1 | 1.17 |
| 11 | 160 | 260 | 128 | B1 | 1.20 |
| 12 | 150 | 550 | 83 | B1 | 1.18 |
| 13 | 160 | 300 | 122 | B1 | 1.15 |
| 14 | 114 | 115 | 106 | B1 | 2.29 |
| 15 | 95 | 300 | 125 | B1 | 1.23 |
| 16 | 104 | 343 | 120 | B1 | 1.18 |
| 17 | 50 | 240 | 93 | B1 | 1.15 |
| 18 | 50 | 70 | 107 | B1 | 1.18 |
| 19 | 67 | 270 | 73 | B1 | 1.17 |
| 20 | 104 | 343 | 120 | B1 | 1.19 |
| 21 | 104 | 343 | 120 | B2 | 1.18 |
| 22 | 104 | 343 | 120 | B3 | 1.16 |
| 23 | 104 | 343 | 120 | B4 | 1.16 |
| 24 | 104 | 343 | 120 | B5 | 1.13 |
| 25 | 104 | 343 | 120 | B6 | 1.20 |

B) Preparation and Testing of an Inventive Ink-Jet Ink

Example 26

A mixture of 60 g of carbon black (Monarch 1000 from Cabot Corporation; BET surface area 340 m²/g; DBP absorption 104 cm³/g), 60 g of dispersant B1, 20 g of 1,2-propylene glycol, 1.6 g of a 50% by weight aqueous solution of glutaraldehyde, 5 g of a 47% by weight aqueous solution of tetramethylolacetylenediurea and 5 g of triethanolamine was made up to a total weight of 400 g with completely ion-free water and dispersed in a stirred ball mill at a circumferential speed of 10 m/s for 2 h to a particle fineness ($d_{50}$ value) of 57 nm.

For final adjustment (4% strength by weight preparation), 40 g of millbase were admixed with 10 g of triethylene glycol monobutyl ether and 10 g of Polytetrahydrofuran 250 (BASF), bulked with water to a total weight of 100 g, mixed and filtered through a sieve having a pore size of 1 μm.

The ink obtained was printed with a commercially available ink-jet printer from Hewlett-Packard (HP Desk Jet 510, cartridge 51629A) on a) uncoated paper (Laser Copier, 80 g/m², Intercopy) and b) on surface-coated paper (Paper for 720 dpi Printing, Epson).

In both cases a stripe-free uniform print (optical density: a) 1.02, b) 1.39) was obtained.

Even after three days of open storage of the cartridge, the ink of the invention exhibited excellent start-of-print behavior.

We claim:

1. Pigment preparations comprising
   A) at least one organic or inorganic pigment and
   B) at least one ethoxylated and propoxylated and/or butoxylated polyethyleneimine containing from 1 to 10 mol of propylene oxide or butylene oxide units and from 10 to 40 mol of ethylene oxide units per mole of N—H function based on a non-alkoxylated polyethyleneimine having an average molecular weight $M_w$ of from 600 to 25000 g/mol.

2. Pigment preparations as claimed in claim 1, wherein said component (B) is an initially propoxylated or butoxylated and then ethoxylated polyethyleneimine.

3. Pigment preparations as claimed in claim 1, containing based on the weight of pigment (A) from 5 to 200% by weight of component (B).

4. Pigment preparations for an ink jet process, comprising
   A) at least one organic or inorganic pigment,
   B) at least one dispersant based on ethoxylated and propoxylated and/or butoxylated polyethyleneimine containing from 1 to 10 mol of propylene oxide or butylene oxide units and from 10 to 40 mol of ethylene oxide units per mole of N—H function based on a non-alkoxylated polyethyleneimine having an average molecular weight $M_w$ of from 600 to 25000 g/mol, and
   C) an aqueous ink medium.

5. Pigment preparations as claimed in claim 4, wherein said component (C) is water (C1) mixed with one or more water-soluble or -miscible organic solvents (C2) having a boiling point >100° C.

6. Pigment preparations as claimed in claim 5, including as organic solvent (C2) one or more solvents selected from the group consisting of polytetrahydrofuran having an average molecular weight $M_w$ of from 150 to 500 g/mol, polyhydric alcohols, polyethylene glycols, polypropylene glycols, polyethylene glycol monoalkyl ethers, polypropylene glycol monoalkyl ethers, pyrrolidone and N-alkylpyrrolidones.

7. Pigment preparations as claimed in claim 5, comprising
   from 0.01 to 20% by weight of component (A),
   from 0.01 to 20% by weight of component (B),
   at least 50% by weight of component (C1), and
   from 0.1 to 40% by weight of component (C2).

8. A method of preparing an aqueous pigment dispersion, an ink, a paint or a toner which comprises mixing
   A) at least one organic or inorganic pigment, and
   B) at least one dispersant based on ethoxylated and propoxylated and/or butoxylated polyethyleneimine containing from 1 to 10 mol of propylene oxide or butylene oxide units and from 10 to 40 mol of ethylene oxide units per mole of N-H function based on a non-alkoxylated polyethyleneimine having an average molecular weight $M_w$ of from 600 to 25000 g/mol,
   in an appropriate conventional application medium.

* * * * *